Oct. 13, 1931.   J. S. JONES   1,827,151
WIND INTENSITY AND DIRECTION TRANSMITTER AND INDICATOR
Filed March 17, 1927   3 Sheets-Sheet 1
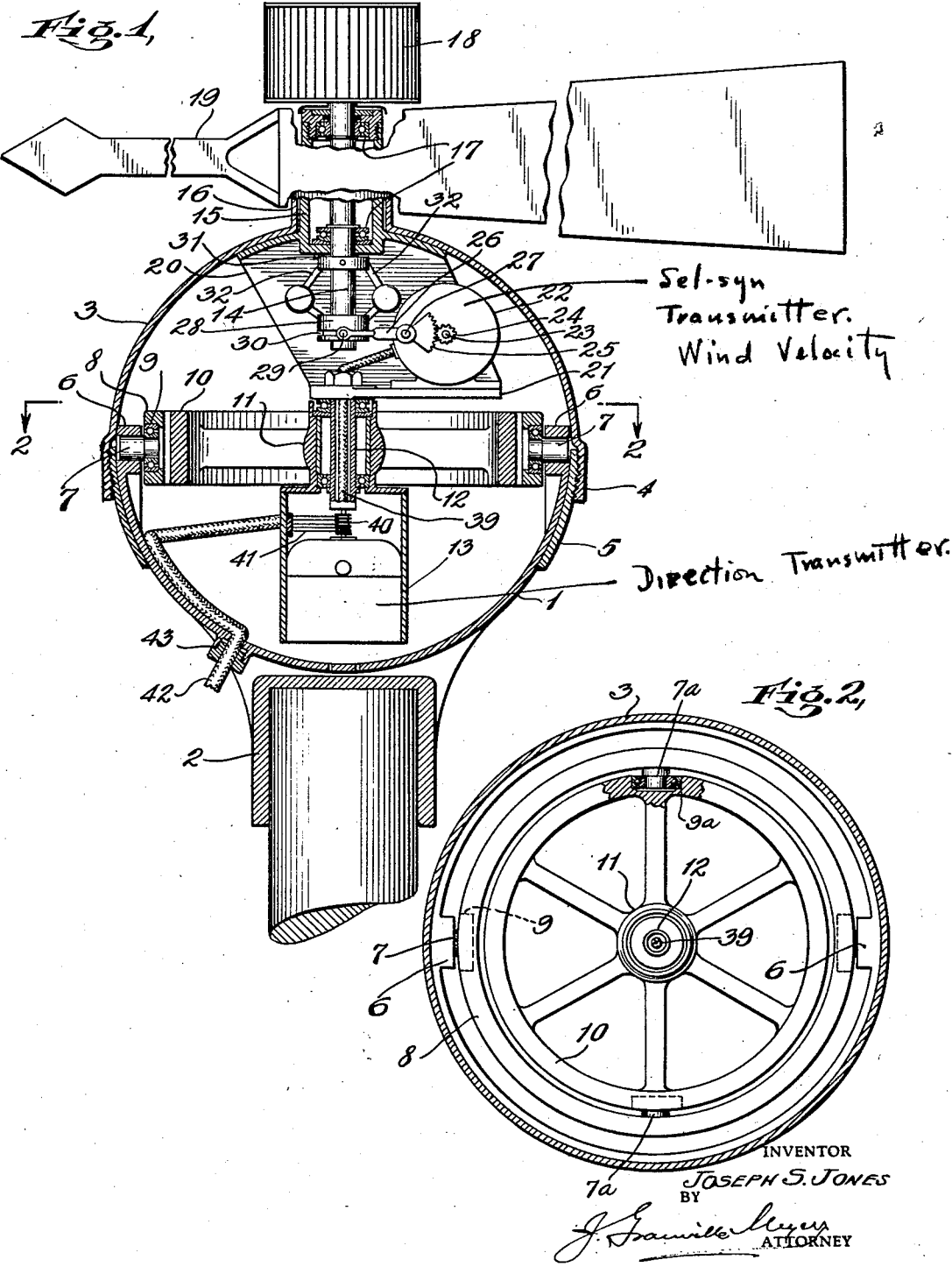

Oct. 13, 1931.    J. S. JONES    1,827,151
WIND INTENSITY AND DIRECTION TRANSMITTER AND INDICATOR
Filed March 17, 1927    3 Sheets-Sheet 2
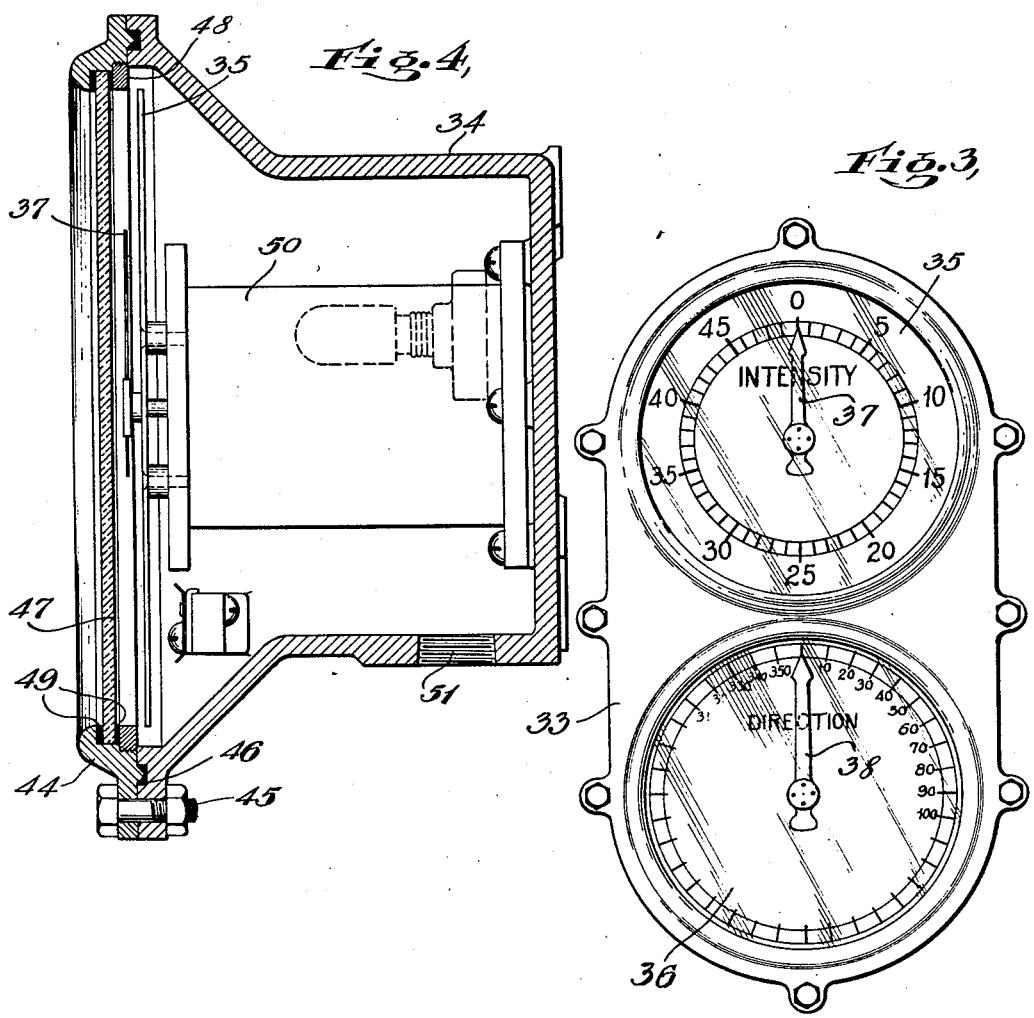
INVENTOR
JOSEPH S. JONES
BY
ATTORNEY Oct. 13, 1931.    J. S. JONES    1,827,151
WIND INTENSITY AND DIRECTION TRANSMITTER AND INDICATOR
Filed March 17, 1927    3 Sheets-Sheet 3
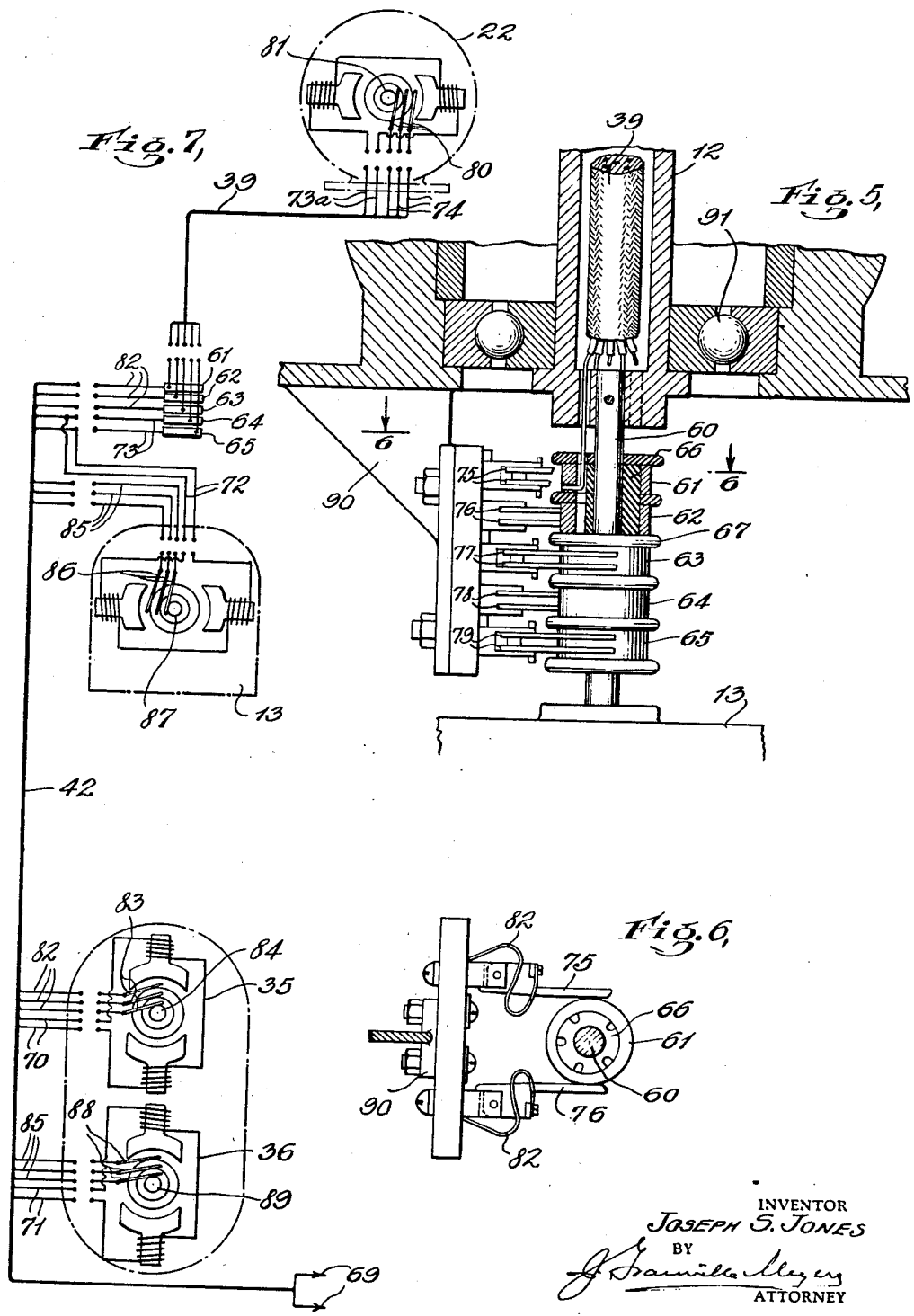
INVENTOR
JOSEPH S. JONES
BY
ATTORNEY Patented Oct. 13, 1931

1,827,151

UNITED STATES PATENT OFFICE

JOSEPH S. JONES, OF BROOKLYN, NEW YORK, ASSIGNOR TO CHAS. CORY CORPORATION, OF NEW YORK, N. Y., A CORPORATION OF NEW YORK

WIND INTENSITY AND DIRECTION TRANSMITTER AND INDICATOR

Application filed March 17, 1927. Serial No. 176,040.

This invention is an improvement in wind intensity and direction transmitters and indicators, and more particularly in devices of this character designed for use on unstable elements, such for instance as ships.

In the use of instruments of this character on shipboard, the support, that is the ship is unstable, tending to roll and to pitch under the influence of the waves. Hence the axis about which the direction transmitter turns and upon which the intensity transmitter rotates is not held vertical, and the effect of the air currents thereon is modified by the movement of the vessel.

One of the primary objects of the present invention is the provision of a support for the transmitter, which under the influence of gravity will remain vertical, regardless of the movement of the vessel with respect to the horizontal.

Another object is the provision of a transmitting connection between the elements directly affected by the change in air currents and the indicating devices, that will not be affected by relative movement of the vessel and said elements.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims may be resorted to without departing from the spirit of the invention.

In the drawings:

Fig. 1 is a side view of the support for the elements directly affected by the change in air currents, with parts in section.

Fig. 2 is a section on the line 2—2 of Fig. 1.

Fig. 3 is a front view of the indicator units.

Fig. 4 is a vertical section of one of the indicating instruments.

Fig. 5 is an enlarged section in detail of the commutator.

Fig. 6 is a section on the line 6—6 of Fig. 5.

Fig. 7 is a diagrammatic view of the wiring.

The present embodiment of the system includes a velocity transmitter in the form of a motor, such as a turbine, to be driven by the air currents, and a direction transmitter, such as a vane, to follow the horizontal shifting of the currents. It also includes electrically controlled mechanisms for indicating on suitable scales the variable movement of the vane and the speed changes of the motor, and other mechanisms for receiving such movement and speed changes respectively, for converting them into electrical impulses, and for transmitting them to the indicating mechanisms.

The vane and the motor are designed to be supported in an elevated position by a spar or mast, and the said elements are mounted on a substantially spherical housing, composed of a lower part or section 1, having a socket 2 or the like which may be engaged with the top of the mast or spar, and an upper section 3. The section 1 is substantially hemispherical and the upper section 3 consists of a substantially hemispherical portion having a marginal outward offset rim 4, which is connected with the ring 5, the upper edge of the ring threaded within the rim. The ring 5 fits the section 1 just below the equator of the sphere, and when connected with the upper portion will hold the parts together, while enabling universal movement of the upper section on the lower section.

The lower section carries a pair of internal oppositely placed bearings 6, in each of which is held a pin 7. An outer gimbal ring 8 is journaled on the reduced inner ends of the pins, a ball bearing 9 being interposed between each pin and the gimbal ring. An inner ring 10 is supported by the outer ring, on pivot pins 7a connected with the outer ring, the said pins being in a line at right angles to the axes of the pins 1. A ball bearing 9a is arranged between each pin and the inner ring.

The inner ring has a central hub 11, which is a part of the stator 13 of a wind direction transmitter unit. The rotor 12 thereof is journaled in the hub, suitable ball bearings being interposed between the rotor and the hub as shown. The gimbal rings provide a universal joint mounting for the stator, and the latter is weighted to hold by gravity the rotor 12 vertical under all conditions, the said stator being well below the center of gravity of the inner gimbal ring.

A second shaft 14 is journaled and free to rotate in a bearing sleeve 15, which is permanently fixed to the upper hemispherical portion 3 by means of a bracket 20 and a nipple 16 at the top and center of the upper section. Ball-bearings 17 are arranged between the shaft and the bearing sleeve, and a suitable wind motor 18, such as a turbine is secured to the upper end of the shaft.

The direction of the wind in azimuth is shown by a vane 19, in the form of an arrow or the like, rigidly connected with the nipple 16 before mentioned, so that the sleeve 15 and upper hemispherical portion 3 turn with the vane. The vane is mounted between the turbine 18 and the spherical portion 1–3. The bracket 20 is rigid with the sleeve 15 and the nipple 16 of the upper half, and is connected to the rotor 12 before mentioned by a member 21 secured to or made integral with bracket 20 and connected to the shaft, the bracket connecting the vane to the rotor, so that angular movement of the vane is imparted thereto.

The member 21 carries a wind intensity transmitter 22, which includes a shaft 23 provided with a pinion 24 meshing with a segment 25 on one end of an arm or lever 26 pivoted at 27 to the unit casing. The other end of the arm is forked, and the arms of the fork are rotatably connected with a collar 28 slidable on the shaft 14 before mentioned. The arms have inwardly extending pins or rollers 29 which engage an annular groove 30 in the collar, so that movement of the collar axially of the shaft will cause angular movement of the shaft of the intensity transmitter.

The collar 28 is a part of a fly ball governor, including in addition to the said collar 28 a fixed collar 31 connected to the collar 28 by the usual weighted toggle lever 32. The arrangement is such that variations in speed of the motor are transmitted to the unit, an increase in speed causing the collar 28 to be moved upward, while a decrease in speed will cause it to be moved downward, it being understood that suitable springs are provided for biasing the collar 28 away from the collar 31.

The transmitter units transmit the variable movements of the vane and motor and transform them into electrical energy, which is employed to actuate other electrically controlled instruments to be described. Each of these instruments includes a suitable water tight casing, which may be a double casing for containing both as shown at 33 in Fig. 3, or a casing for each instrument, as shown at 34 in Fig. 4.

In either instance the casing or casings for the instruments may be secured to a fixed support as for instance a bulk head. The casings for the instruments are water tight, and each instrument includes a dial, suitably calibrated as shown, a pointer 37 cooperating with the dial of the instrument 35, and a pointer 38 with the dial of the instrument 36.

A flexible cable 39 extends through the hollow rotor 12, and the lower end of the rotor carries a suitable commutator to be described. The cable passes through a water tight nipple 43 in the lower part of the casing 1–3, to the indicating instruments.

By one set of lead wires the movement of the collar 28, that is the speed of the air motor is transmitted to the appropriate indicator, and by the other set of wires the angular movement of the shaft 12 is transmitted. Regardless of the position of the plane of the vessel deck, the alined shafts 12 and 14 always will be held vertical by gravity, and the variations in wind intensity, and in azimuth will be correctly transmitted to the respective indicators.

In accordance with the velocity of the wind, the collar 28 moves up or down, swinging the lever 26, which through the gear segment connection operates the shaft 23. When the vane is moved angularly by a change in air current, the bracket 21 is also moved, as well as the shaft 12, and this change in movement is transmitted by the lead wires to the appropriate indicator.

As shown in Fig. 4, the casing for the indicator or indicators has a cover 44 secured to the body of the casing by bolts and nuts 45. A gasket 46 is arranged between the cover and the body of the casing. The cover, which is a ring of metal carrying a plate 47 of glass enables the movement of the indicator 37 or 38 to be observed. The plate is held in place by a ring 48 threaded into the cover as shown, and the gaskets 49 are arranged on opposite sides of the plate to make a water tight joint. The electrically controlled mechanism connected with the transmitting unit, for moving the pointer or indicator is indicated at 50. The body of the casing has an internally threaded opening 51, through which the cable carrying the lead wires of the circuits may be passed, and this opening is sealed about the cable in any usual or desired manner.

In operation, shifting of the vane 19 moves the rotor of the unit 12—13 with respect to the stator, and such movements of the rotor are transformed into electrical energy by the unit, which energy operates the indicator 36, moving the pointer thereof to indicate on the scale the angular shift in degrees. Variations in wind intensity are translated by the governor into angular movement of the shaft 23. The unit 22 transforms this angular movement of the shaft into electrical force, which operates the pointer of the instrument 35, causing it to move over the scale and to indicate the speed at which the motor is rotated.

Referring more particularly to Fig. 5, it will be noticed that the commutator shaft 60 is carried by the lower end of the rotor 12, the shaft extending below the rotor and being pinned thereto. The shaft carries a series of rings, indicated at 61, 62, 63, 64 and 65 respectively, of conducting material, which are insulated from the shaft by an insulating sleeve 66, and from each other by insulating rings 67. The respective rings are connected by lead wires with the wind intensity transmitter unit 22, the said wires being arranged in the flexible cable 39.

Current is supplied to the several units and indicators from a suitable source by supply leads 69 arranged in the cable 42. Branches 70, 71 and 72 supply current to the magnets of the indicators 35 and 36 respectively and to the magnets of the unit 13. Other branch wires 73–73a supply current to the magnets of the unit 22.

Brushes 75, 76, 77, 78 and 79 cooperate with the respective rings 61 to 65, and the brushes alternately engage opposite sides of the commutator, constituted by the rings and associated parts. The members of the pair of lead wires 73 are connected with the brushes 78 and 79, the said wires 73 being branched on the wires 72 before mentioned, and the wires 73a connected with the rings 64 and 65 supply current to the magnets of the units 22.

Other lead wires 74 lead from the brushes 80 of the commutator 81 of the unit 22 to the rings 61, 62 and 63, and lead wires 82 connect the brushes 75, 76 and 77 with brushes 83 cooperating with the commutator 84 of the instrument 35. Lead wires 85 connect the brushes 86 of the commutator 87 of the unit 13, with brushes 88 cooperating with the commutator 89 of the indicator 36.

The lead wires 82, 72, 85, 70 and 71 are arranged in the cable 42, and the brushes 75 to 79 inclusive are carried by a bracket 90 integral with the hub 11 of the inner gimbal ring 10, the brushes being insulated therefrom in the usual manner. Since the transmitter units, the indicators and the wire form no part of the present invention, they are not described more in detail. It will be noticed referring particularly to Fig. 5, that ballbearings 91 are arranged between the rotor 12 and the hub of the gimbal ring 10.

The improved apparatus is designed and is suitable for operation under all weather conditions, due to the manner in which the entire equipment is protected from weather conditions, such as hail, sleet, rain and the like.

What is claimed as new is:

1. In a device of the class described, in combination, a main support, a gimbal ring having bearings in said support, a second gimbal ring having a bearing support in said first-named gimbal ring, a transmitter having relatively stationary and rotatable elements, means for supporting the transmitter centrally of and below the second-named ring, a shaft connected to the rotating element of the transmitter, means for rotatably mounting said shaft with respect to the second-named ring, supporting means mounted on said shaft above the latter and including a supporting portion and a bearing sleeve in vertical alignment with the shaft, a wind motor, a shaft for said wind motor rotatably mounted in said sleeve, a transmitter including relatively stationary and movable members mounted on said supporting portion, and means operatively connecting said wind motor shaft and said relatively movable transmitter member for moving the latter in accordance with the speed of the wind motor, said device having casing means for the mechanism including a movable member connected to the supporting means and permitting universal movement of the latter with respect to the main support, and a wind vane connected to the supporting member between the wind motor and the movable casing member.

2. In a device of the class described, a wind motor having a shaft, a movable vane, a casing of spherical form including a lower relatively fixed supporting meber and an upper member universally movable with respect to said lower member, a bracket within the casing and connected with said vane, a gimbal joint connection between the bracket and the lower member of the casing, said bracket having a bearing in which the motor shaft is journaled, and mechanism for transmitting the variable movements of the motor and the vane housed within the casing, and means for counterweighting the said bracket to maintain the motor shaft vertical.

3. In a device of the class described, a two-part spherical housing, including a lower part adapted for connection with a relatively fixed support, and an upper part universally movable with respect to said lower part, a sleeve fixed at the center of the upper part, a vane carried on said upper part above the housing, a shaft journaled in the sleeve, a wind motor above the said vane and drivably connected with said shaft, a bracket inside of the casing rigidly connected with the sleeve to move therewith and to move the upper housing part with respect to the lower housing part, a transmitter unit supported by the bracket, operative connections between the unit and the motor to transmit the variable movement of the latter to said unit, a counterweighted direction transmitting unit having a rotor and a stator the said stator being in alignment with the first-named shaft, a gimbal support for the stator associated with the lower housing part the rotor of the direction transmitting unit being journaled in the stator, and an operative connection between the rotor of the direction transmitting unit and the bracket to cause the bracket to move with the rotor.

4. In combination with a main support, a casing having upper and lower sections said lower section being carried by the support, means for mounting the upper section for universal movement with respect to the lower section, a wind vane carried by the upper section, means for maintaining the plane of said vane substantially horizontal at all times, a wind motor rotatably mounted on said upper section and means for remotely transmitting the movements of said vane and motor, said means being housed within said casing.

Signed at 183–7 Varick Street, New York city, in the county of New York and State of New York this 15th day of March A. D. 1927.

JOSEPH S. JONES.